(12) United States Patent  
Hung

(10) Patent No.: US 9,046,662 B2  
(45) Date of Patent: Jun. 2, 2015

(54) OPTICAL CONNECTOR WITH ALIGNMENT DEVICE

(71) Applicant: HON HAI PRECISION INDUSTRY CO., LTD., New Taipei (TW)

(72) Inventor: Yi Hung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/019,558

(22) Filed: Sep. 6, 2013

(65) Prior Publication Data

US 2014/0294354 A1 Oct. 2, 2014

(30) Foreign Application Priority Data

Apr. 2, 2013 (TW) .............................. 102111844 A

(51) Int. Cl.
*G02B 6/43* (2006.01)
*G02B 6/42* (2006.01)

(52) U.S. Cl.
CPC .................................... *G02B 6/4204* (2013.01)

(58) Field of Classification Search
CPC ..................................................... G02B 6/4228

USPC ............................................................. 385/93
See application file for complete search history.

(56) References Cited

U.S. PATENT DOCUMENTS

| | | | |
|---|---|---|---|
| 6,533,471 B2 * | 3/2003 | Han et al. .......................... | 385/92 |
| 8,721,194 B2 * | 5/2014 | Huang et al. ..................... | 385/93 |
| 2004/0120659 A1 * | 6/2004 | Cheng et al. ..................... | 385/89 |
| 2007/0058904 A1 * | 3/2007 | Ban et al. ......................... | 385/52 |

* cited by examiner

*Primary Examiner* — Omar R Rojas
(74) *Attorney, Agent, or Firm* — Novak Druce Connolly Bove + Quigg LLP

(57) ABSTRACT

An optical connector includes a printed circuit board, a photoelectric element, a positioning element, and a lens element. The positioning element is positioned on the printed circuit board and covers the photoelectric element. The positioning element includes a top surface facing away from the printed circuit board, and defines a through hole in a top surface thereof to expose the photoelectric element. The positioning element also includes a mark system formed on the top surface for facilitating alignment between the positioning element and the photoelectric element. The lens element is positioned on the positioning element and includes a first surface facing the photoelectric element, and a first lens aligned with the photoelectric element.

14 Claims, 4 Drawing Sheets

OPTICAL CONNECTOR WITH ALIGNMENT DEVICE

BACKGROUND

1. Technical Field

The present disclosure relates to optical connectors and, particularly to a device for aligning optical connectors.

2. Description of Related Art

Optical connectors include a printed circuit board, a photoelectric element, and a lens element. The photoelectric element and the lens element are positioned on the printed circuit board. The lens element covers the photoelectric element and includes a lens aligned with the photoelectric element. Thus, the photoelectric element can emit or receive light via the lens to increase light usage efficiency. However, due to limited assembling precision, the lens can misalign with the photoelectric element, and the misalignment cannot be detected.

Therefore, it is desirable to provide an optical connector that can overcome the above-mentioned problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will be described with reference to the drawings.

Figure 1:
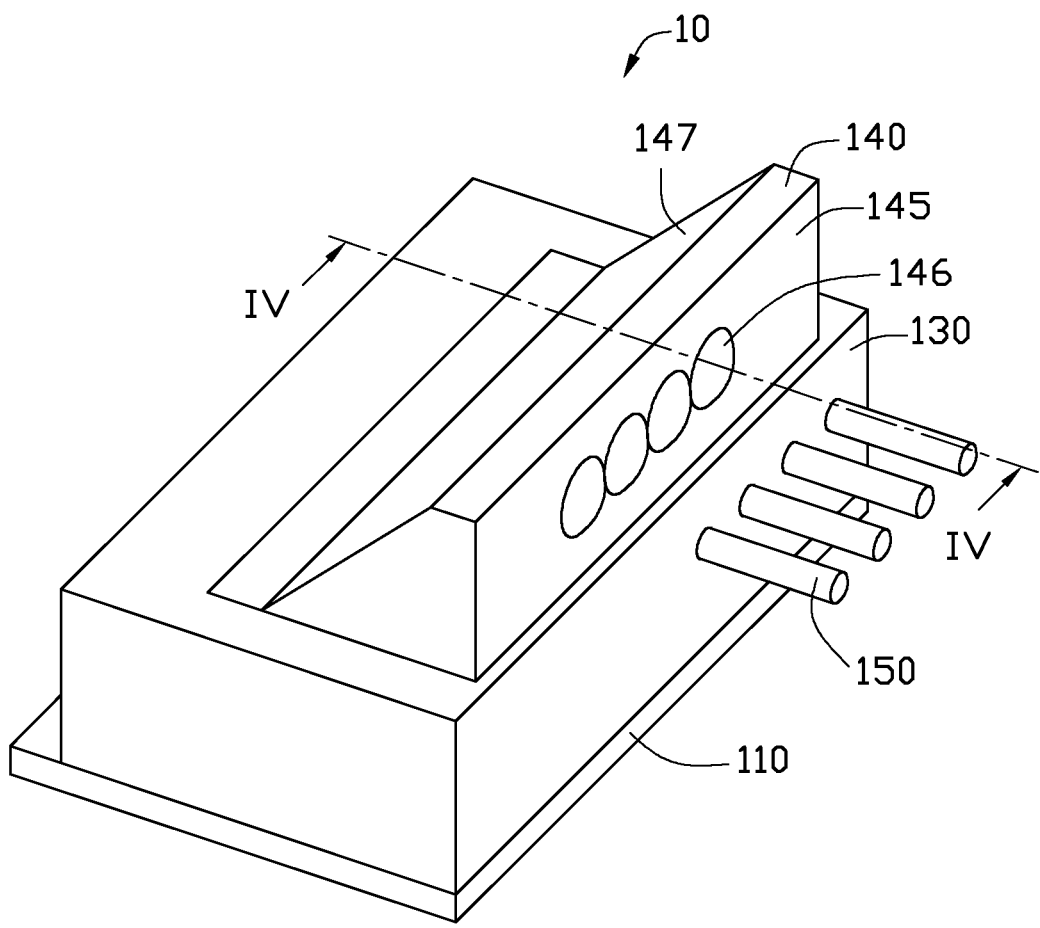
FIG. 1 is an isometric schematic view of an optical connector, according to an embodiment.
Figure 2:
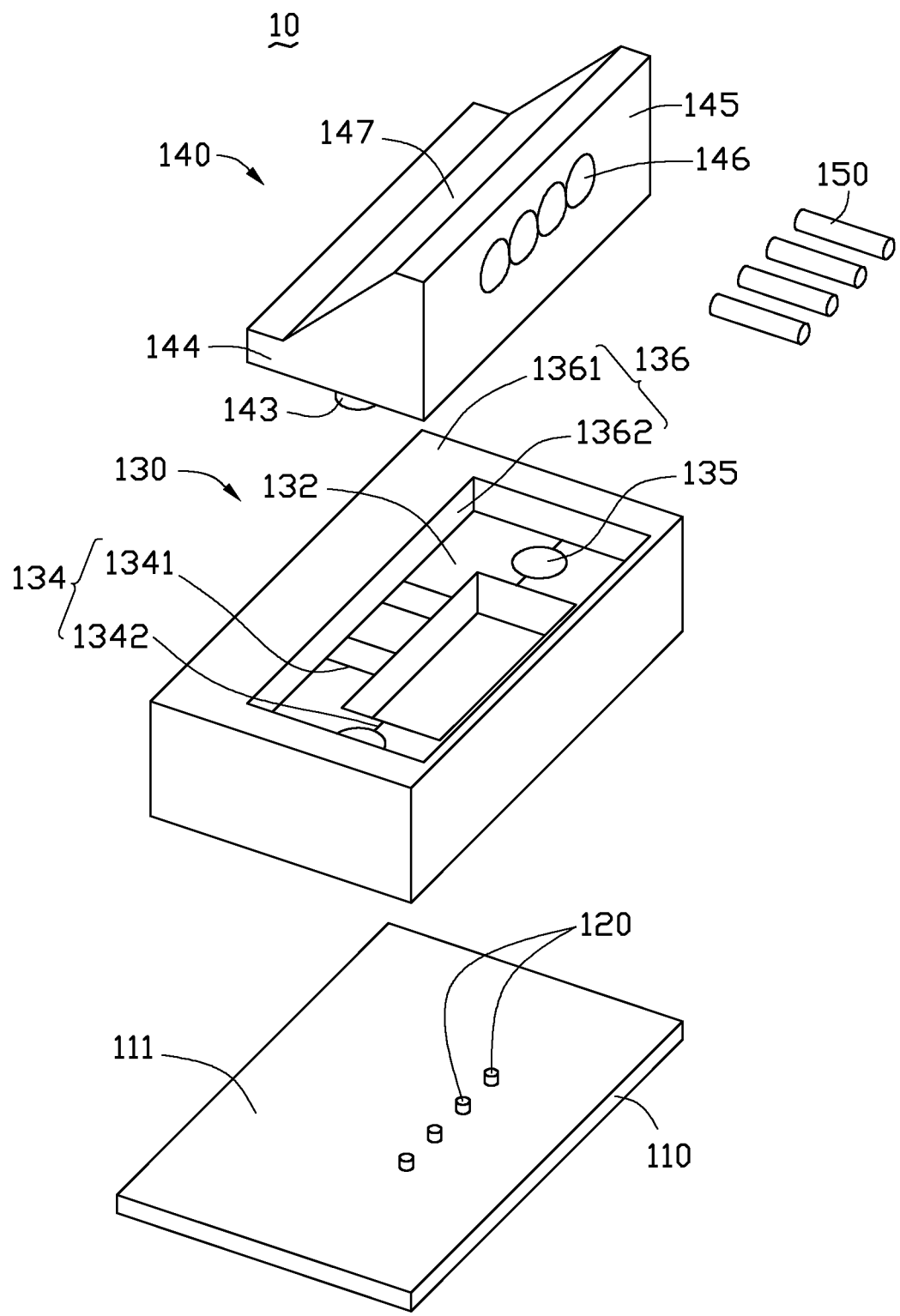
FIG. 2 is an exploded view of the optical connector of FIG. 1.
Figure 3:
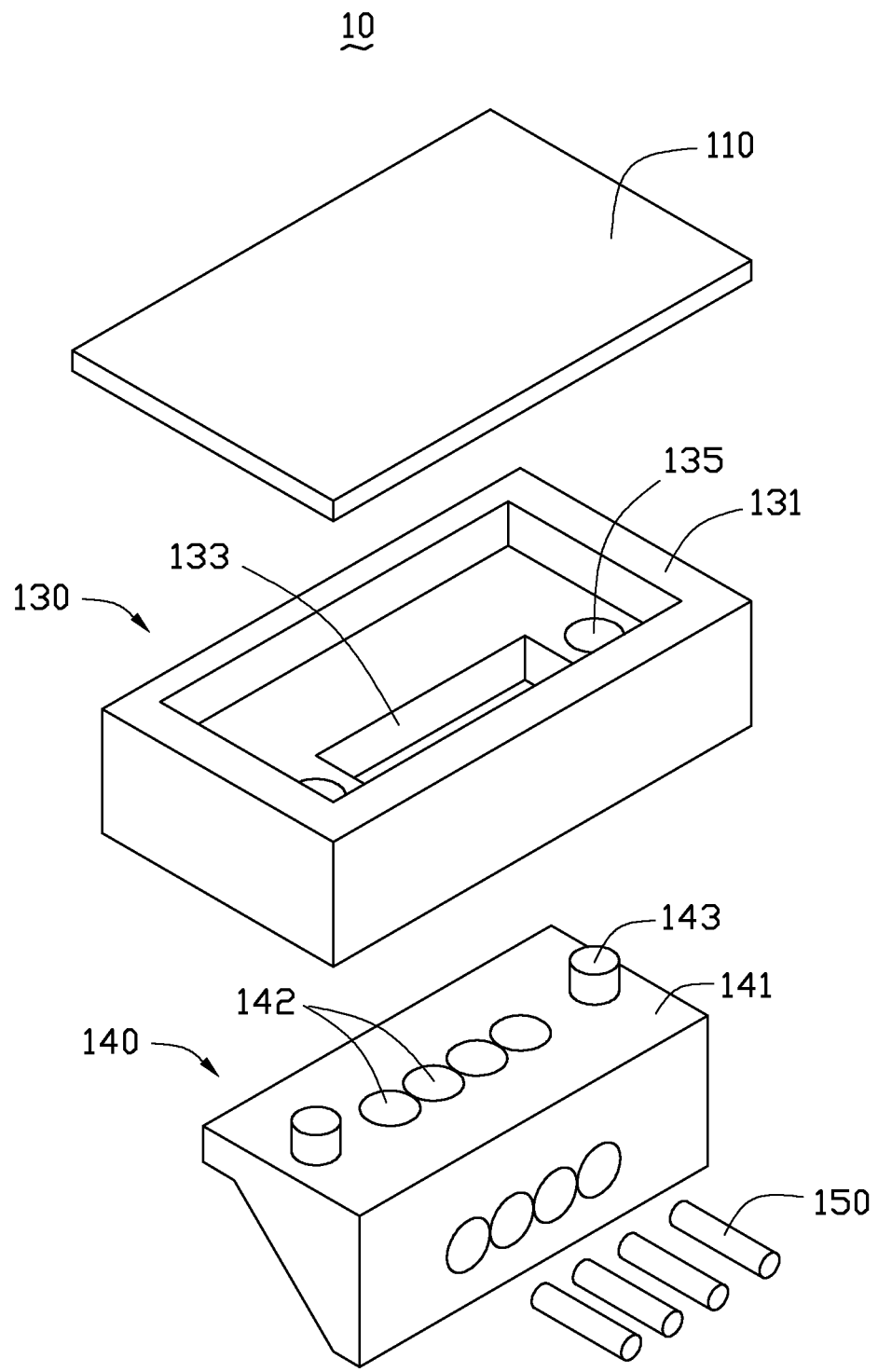
FIG. 3 is similar with FIG. 2, but is viewed from another angle.
Figure 4:
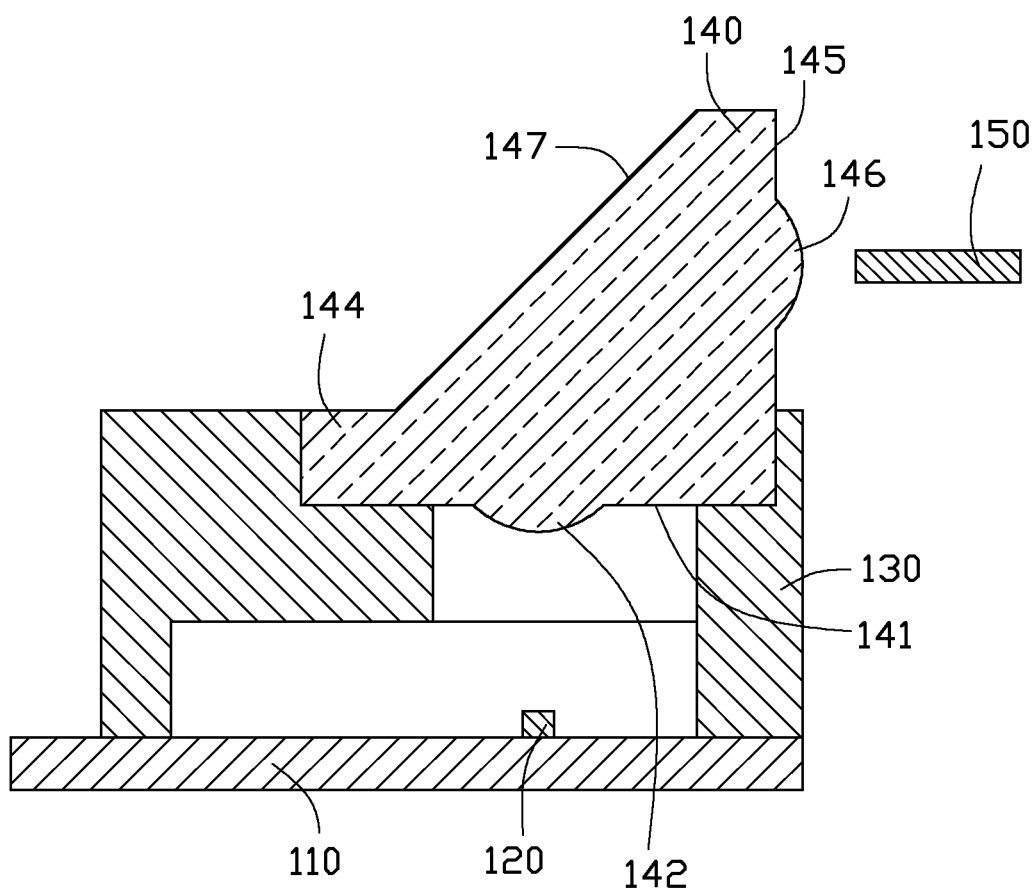
FIG. 4 is a cross-sectional view of the optical connector of FIG. 1, taken along line IV.

FIGS. 1-3 show an optical connector 10, according to an embodiment. The optical connector 10 includes a printed circuit board 110, four photoelectric elements 120, a positioning element 130, a lens element 140, and four optical fibers 150.

The printed circuit board 110 can be a ceramic substrate having internal circuits (not shown), and includes an upper surface 111 and a number of pads (not shown) formed on the upper surface 111. The printed circuit board 110 is manufactured by high-precision semiconductor technology. As such, the pads are precisely formed on the upper surface 111.

The photoelectric elements 120 can be light emitters, such as light emitting diodes and laser diodes, or light receivers, such as photo diodes. The photoelectric elements 120 are soldered to the pads and are electrically connected to the printed circuit board 110 through the pads. As the pads are precisely formed, the photoelectric elements 120 are precisely positioned on the upper surface 111. In this embodiment, the photoelectric elements 120 are linearly arranged.

The positioning element 130 is substantially rectangular and includes a bottom surface 131 and a top surface 132 opposite to the bottom surface 131. The positioning element 130 defines a substantially rectangular through hole 133 extending through the bottom surface 131 and the top surface 132.

The positioning element 130 also has a mark system 134, a first positioning structure 135, and a first locating structure 136 on the top surface 132.

In this embodiment, the mark system 134 has four first marks 1341, such as lines, parallel to short sides of the through hole 133 (hereinafter "first marks 1341" is called "first mark lines 1341"), and a second mark 1342, such as a line, parallel to the long sides of the through hole 133 (hereinafter "second mark 1342" is called "second mark line 1342"). Specifically, the mark system 134 is formed such that when the positioning element 130 is positioned on the printed circuit board 110, each of the first mark lines 1341 passes a center of one of the photoelectric elements 120, and the second mark line 1342 passes centers of all of the photoelectric elements 120, so that the positioning element 130 is precisely positioned on the printed circuit board 110.

The first positioning structure 135 is two holes positioned at two opposite sides of the through hole 133, respectively. The first locating structure 136 is a raised surface 1361 extending up from an outer periphery of the top surface 132. The first locating structure 136 defines a rectangular space 1362 therein.

The lens element 140 includes a first surface 141, a second surface 145 connected substantially perpendicularly to the first surface 141, and a third surface 147 slantingly connected between the first surface 141 and the second surface 145.

The lens element 140 includes four first lenses 142, a second positioning structure 143, and a second locating structure 144.

In this embodiment, the first lenses 142 are arranged in a line, corresponding to the photoelectric elements 120. The second positioning structure 143 is two positioning poles extending up from the first surface 141. The second locating structure 144 is the outer peripheral surfaces of the lens element 140.

The lens element 140 also includes four second lenses 146 formed on the second surface 145. The third surface 147 is a reflective surface and the second lenses 146 are linearly arranged and are respectively optically aligned with the first lenses 142 via the third surface 147.

In assembly, the positioning element 130 is placed on the printed circuit board 110, such that the photoelectric elements 120 are exposed via the through hole 133. The positioning element 130 is positioned, such that the second mark line 1342 is aligned with the centers of the photoelectric elements 120, and each first mark line 1341 is respectively aligned with the centers of the photoelectric elements 120. Therefore, alignment between the positioning element 130 and the photoelectric elements 120 is visually inspected through the through hole 133, so that the positioning element 130 is precisely positioned on the printed circuit board.

Then, the lens element 140 is positioned on the positioning element 130 by engagement between the first locating structure 136 and the second locating structure 144. Next, a position of the lens element 140 is finely adjusted such that the first positioning structure 135 is engaged with the second positioning structure 143. Therefore, the lens element 140 is precisely positioned on the positioning element 130. Therefore, precise alignment between the first lenses 142 and the photoelectric elements 120 is ensured.

Finally, the optical fibers 150 are respectively optically aligned with the second lenses 146.

In operation, light is transmitted with high efficiency among the first lenses 142, the third surface 147 (i.e., reflected off by the third surface 147), and the corresponding second lenses 146.

The first positioning structure 135 and the second positioning structure 143 are not limited to as described in this embodiment, and can be changed as needed. For example, in other embodiments, the first positioning structure 135 can be poles, and the second positioning structure 143 can be holes.

The first locating structure 136 and the second locating structure 144 are not limited to as described in this embodiment, and can be changed as needed. For example, in other embodiments, the first locating structure 136 can be a recess indented into the outer periphery of the top surface 132, and the second locating structure 144 can be a wall.

Numbers of the photoelectric elements 120, the first lenses 142, the second lenses 146, and the optical fibers 150 are not limited to four, and can be changed as needed. For example, in another embodiment, only one photoelectric element 120, one first lens 142, one second lens 146, and one optical fiber 150 is employed. In this case, only one first mark line 1341 is needed to ensure alignment between the positioning element 130 and the photoelectric element 120.

It will be understood that the above particular embodiments are shown and described by way of illustration only. The principles and the features of the present disclosure may be employed in various and numerous embodiments thereof without departing from the scope of the disclosure. The above-described embodiments illustrate the possible scope of the disclosure but do not restrict the scope of the disclosure.

What is claimed is:

1. An optical connector, comprising:
a printed circuit board comprising an upper surface;
a photoelectric element positioned on the upper surface;
a positioning element positioned on the upper surface and covering the photoelectric element, the positioning element comprising a top surface facing away the upper surface and a bottom surface contacting and overlapping with the upper surface, the top surface and the bottom surface positioned at opposite sides of the positioning element, the positioning element defining a through hole extending through the top surface and the bottom surface to expose the photoelectric element, the positioning element comprising a mark system formed on the top surface for facilitating alignment between the positioning element and the photoelectric element, the through hole being substantially rectangular, the mark system comprising a line-shaped first mark line parallel with a short side of the through hole and a line-shaped second mark line parallel with a long side of the through hole, when the positioning element is aligned with the photoelectric element, the first mark line passes a center of the photoelectric element, and the second mark passes the center of the photoelectric element; and
a lens element positioned on the positioning element, the lens element comprising a first surface facing the photoelectric element and a first lens aligned with the photoelectric element.

2. The optical connector of claim 1, wherein the photoelectric element is a light emitter selected from the group consisting of a light emitting diode and a laser diode.

3. The optical connector of claim 1, wherein the photoelectric element is a light receiver.

4. The optical connector of claim 1, wherein the photoelectric element is a photo diode.

5. The optical connector of claim 1, wherein the positioning element comprises a first positioning structure formed on the top surface, the lens element comprises a second positioning structure formed on the first surface, and the lens element is positioned on the positioning element by engagement between the first positioning structure and the second positioning structure.

6. The optical connector of claim 5, wherein the first positioning structure is two holes defined in the top surface and located at two opposite sides of the through hole, and the second positioning structure is two poles extending up from the first surface and fittingly inserted into the holes.

7. The optical connector claim 5, wherein the positioning element comprises a first locating structure formed on the top surface, the lens element comprises a second locating structure formed on the first surface, sizes of the first locating structure and the second locating structure are larger than sizes of the first positioning structure and the second positioning structure, and the lens element is quickly located on the positioning element by engagement between the first locating structure and the second locating structure.

8. The optical connector of claim 7, wherein the first locating structure is a receiving space, and the second locating structure is a block.

9. An optical connector comprising:
a printed circuit board comprising an upper surface;
a plurality of photoelectric elements positioned on the upper surface;
a positioning element positioned on the upper surface and covering the photoelectric elements, the positioning element comprising a top surface facing away the upper surface and a bottom surface contacting and overlapping with the upper surface, the top surface and the bottom surface positioned at opposite sides of the positioning element, the positioning element defining a through hole extending through the top surface and the bottom surface to expose the photoelectric elements, the positioning element comprising a mark system formed on the top surface for facilitating alignment between the positioning element and the photoelectric elements, the through hole being substantially rectangular, the mark system comprising a plurality of line-shaped first mark lines parallel with a short side of the through hole and a line-shaped second mark line parallel with a long side of the through hole, when the positioning element is aligned with the photoelectric elements, the first mark lines respectively pass centers of the photoelectric elements, and the second mark line passes the centers of all of the photoelectric elements; and
a lens element positioned on the positioning element, the lens element comprising a first surface facing the photoelectric elements and a plurality of first lenses respectively aligned with the photoelectric elements.

10. The optical connector of claim 9, wherein the photoelectric elements include light receiver and photo diode.

11. The optical connector of claim 9, wherein the positioning element comprises a first positioning structure formed on the top surface, the lens element comprises a second positioning structure formed on the first surface, and the lens element is positioned on the positioning element by engagement between the first positioning structure and the second positioning structure.

12. The optical connector of claim 11, wherein the first positioning structure is two holes defined in the top surface and located at two opposite sides of the through hole, and the second positioning structure is two poles extending up from the first surface and fittingly inserted into the holes.

13. The optical connector claim 11, wherein the positioning element comprises a first locating structure formed on the top surface, the lens element comprises a second locating structure formed on the first surface, sizes of the first locating structure and the second locating structure are larger than sizes of the first positioning structure and the second positioning structure, and the lens element is quickly located on the positioning element by engagement between the first locating structure and the second locating structure.

14. The optical connector of claim 13, wherein the first locating structure is a receiving space, and the second locating structure is a block.

* * * * *